United States Patent

[11] 3,600,657

[72] Inventors Ernest H. Pfaff
Deerfield;
Thomas F. Mills, Jr., Chicago, both of, Ill.
[21] Appl. No. 47,087
[22] Filed June 17, 1970
[45] Patented Aug. 17, 1971
[73] Assignee Jeanne Pfaff
Deerfield, Ill.
Continuation-in-part of application Ser. No. 720,554, Apr. 11, 1968, now Patent No. 3,518,810. This application June 17, 1970, Ser. No. 047,087

[54] METHOD AND APPARATUS FOR ELECTRONIC SENSING OF MOTOR TORQUE
10 Claims, 3 Drawing Figs.
[52] U.S. Cl. ........................................................ 318/218, 318/314, 318/315, 317/13, 317/27
[51] Int. Cl. ........................................................ H02p 5/42
[50] Field of Search ............................................. 318/218, 314, 335; 317/13, 27

[56] References Cited
UNITED STATES PATENTS

| | | | |
|---|---|---|---|
| 2,722,648 | 11/1955 | Dunigan........................ | 317/13 |
| 2,992,365 | 7/1961 | Brill.............................. | 318/455 |
| 3,131,392 | 4/1964 | Braun............................ | 317/27 |
| 3,202,877 | 8/1965 | Perrault......................... | 317/27 |
| 3,519,910 | 7/1970 | Pfaff et al. .................... | 318/218 |

*Primary Examiner*—Gene Z. Rubinson
*Attorney*—J. D. Douglass

ABSTRACT: A circuit is provided for connection to an AC line and a reactive load which extracts a voltage wave form from the line, the phase of which is adjustable. A pickup to the load extracts a current wave form from the load on the line to the load and converts the current wave form to pulses which are synchronized with the zero crossing or points where the current goes to zero. A phase detector is connected to the voltage wave source and the current zero crossing pulse source and converts the signals to a DC analog output of the phase relationship between the voltage and current wave and this current is used to control by means of a voltage level operated switch, and an external circuit.

INVENTORS
Ernest H. Pfaff
Thomas F. Mills Jr.

BY  J. D. Douglas
their atty

METHOD AND APPARATUS FOR ELECTRONIC SENSING OF MOTOR TORQUE

It is a continuation-in-part of our copending application Ser. No. 720,554, filed Apr. 11, 1968 now Pat. No. 3,519,910.

This invention relates to a method and apparatus for critically sensing the difference in the phase angle between the voltage and current in a reactive load. The invention is particularly useful in conjunction with the sensing of the phase relationship between the current and load represented by a reactive device such as a motor where it is desirable to control the motor according to its loading.

There are many places in the industry where it is desirable to discontinue power to a motor when the load attains a certain value. This may be to protect the motor against burnout or to interrupt the power when the work being driven achieves a certain state. The last means includes, but is not limited to, the discontinuance of power to a motor which is driving the mixing or stirring elements of a device such as an ice cream freezer. In this instance it is desirable to discontinue the stirring operation when the mixture reaches a certain consistency. It may also be used to control other devices such as feed motors which operate in conjunction with a precess motor.

Although heretofore mechanical torque releasing means have been proposed and used to disconnect the motor from the load, there have been certain inherent disadvantages inherent thereon such as the fact that they are often difficult to install in existing machines because of space limitations; difficult to adjust to operate at an exact amount of torque; and further, torque means for one size of motor could not be used for larger or smaller motors, making it necessary to stock many different sizes of such devices. Magnetic and current operated means have also been proposed but have undesirable features, such as expensive relays and multiple switching means which are subject to deterioration, bulky and difficult to adjust and install and were also critical as to motor size.

By the present invention a torque-operated means which requires no mechanical connection between motor and the machine being driven, is possible. It may be installed by a few simple electrical connections and disposed in any convenient location taking up a minimum of space. It is also economical to manufacture and requires standard electrical components which are readily available on the market. It can be used to control a switch which will turn a motor off and on with an extremely small differential at a precise amount of mechanical load and with a minimum of influence by "wow" of motor and line voltage changes. A further advantage resides in the fact that the parts may be of a modular construction and the separate components or an entire device potted in a suitable material, making it difficult, if not impossible, for unauthorized persons to tamper with it, and, furnishing protection against deterioration by the elements. One device may also be used with motors of vastly different capacity.

Still other advantages of the invention and the invention itself will become more apparent from the following description of an embodiment thereof which is illustrated by the accompanying drawings and forms a part of this specification.

Figure 1:
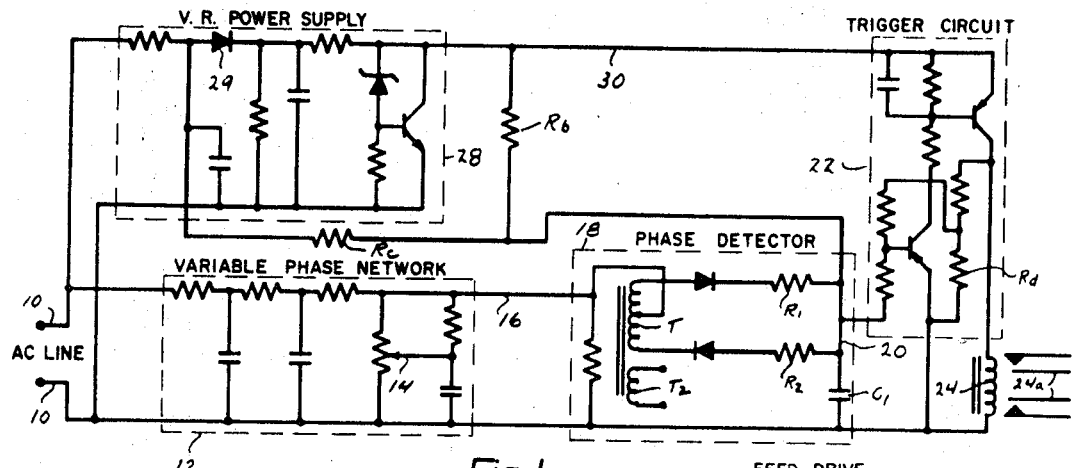
FIG. 1 is a schematic diagram of a circuit which may be used to carry out the invention used in conjunction with means for opening a motor circuit.

The invention will first be described in conjunction with its use for controlling a motor by shutting off the motor when a certain amount of torque is present. It will be apparent that there are other uses to which it may be put which embody the basic functions and that the invention is not limited to the specific application or applications cited.

It is known that as a motor is loaded the current increases but this increase is not of considerable consequence. There is one thing, however, that does change with change in load and that is the phase angle between the current and line voltage. With an increase in load the angles come more nearly into phase. Thus, the actual change in phase angle may be considered as relatively greater than the current change and the power factor is a much closer analog of the load than anything else. This points out that current operated devices have inherently less sensitivity than could be desired. In this invention utilization is made of the change in phase angle which is greater per unit load and thus enables a more accurate degree of control, based on load, to be obtained. Of particular interest is the fact that on loads considerably less than full load the system has even greater sensitivity.

Advantage is taken of the change in phase angle to perform the operation. Briefly, a voltage wave is taken from the line and passed through a controllable phase shift network to a detector or a discriminator circuit. Means is provided for obtaining a current signal from the load and may include a winding on a transformer that may be inserted in the motor line which obtains a current signal, the phase angle of which depends upon the load, which is injected into a transformer in the discriminator circuit.

Another means includes a phase detector circuit which is operated by the voltage wave and pulses controlled by the current wave to provide an analog output to operate a motor control.

One manner of operation is to adjust the phase shift circuit until the point is reached where as long as the motor is operating under the critical load there is a DC output from the detector circuit because of the phase difference. As the load on the motor approaches the value at which it is to be cut off, the change in phase angle from the signal from the motor is such that the DC voltage is reduced at the detector output.

It will be apparent that at the output of the detector various conditions can be realized. A positive voltage could be present under one condition. No voltage under another condition and a negative voltage under a third condition. Therefore, the output from the detector can be used to control the speed of a motor to step up the speed if it is too low; maintain the speed at a desired speed; cut down the speed if it is too high; or cut off power to the motor. In other words, besides shutting off the motor, it can be used to control the speed of a piece of apparatus the same as a governor, but with none of the inherent mechanical defects thereof.

One particular desirable application is for controlling the refrigeration of an ice cream making machine. In this operation the mix is placed in the machine and the beater started. The phase shift circuit is initially adjusted so that there is an output at the discriminator circuit which closes the refrigeration control circuit at the end of the beater starting surge. When the shift in phase of the beater motor, due to increase in load, is such as to bring the two signals in the detector circuit into phase, the refrigeration opening circuit is operated, which is set to occur when the mix reaches the desired consistency, shutting off the refrigeration. With this type of operation a failure in the control circuit would result in a "fail-safe" operation.

It is apparent that a signal device can be used to effect the desired operation on various horsepower motor circuits without being effected by the size of the motor or the current drain other than as the drain causes the desired phase shift. It is also apparent that amplification could be added to the circuit shown to make it even more sensitive when desired.

More specifically as shown in the drawing, the voltage from the line 10 is applied to the input of the phase changer network 12, the phase of which may be shifted by moving the slider 14. This network is well known in the art and others may be substituted if desired, the only requirement being that it have the desired change of adjustment.

The output from this network is fed by the line 16 to the center tap of a discriminator transformer T in the discriminator circuit 18. The discriminator circuit can be relatively simple and of conventional design consisting of the transformer T, the ends of the main winding being connected to diodes poled in opposite directions and with a filtering and signal combining network consisting of the two balanced resistors $R_1$ and $R_2$ which are connected by line 20 to condenser $C_1$.

An independent winding $T_2$, which is associated with the core of the transformer, has terminals which are inserted in series with one of the power lines to the motor and picks up an AC current wave signal which is induced into the main winding and is there present along with the phase-controlled voltage signal from the line 10.

The motor control circuit 22 may take various forms. In this particular instance it is shown as a conventional transistorized Schmitt trigger circuit which has in its output a relay coil 24 which when energized causes a set of contacts 24a to be closed. It is pointed out that the circuit could be arranged to hold the contacts open or closed depending upon the particular type of control desired.

Power for the trigger circuit is obtained from a transistorized regulated voltage supply 28 which obtains its power from the line 10 and supplies power to the trigger circuit through the line 30.

Although in the interest of simplicity a single phase circuit is shown, multiple phase circuits could be used as would be apparent to those versed in the art. The resistor $R_d$ in the trigger circuit may be variable to control the differential at which the trigger circuit operates.

A refinement of the invention consists in means to compensate for line voltage fluctuations. Should the line voltage increase, due to a reduction in line load, there would be an increase in terminal voltage to the motor; the result is a retardation of the motor current phase angle. This could result in a requirement for a heavier trip load than at normal line voltage because it has the ultimate effect of a decrease in load.

Means is provided to introduce into the phase detector output a DC voltage, derived from the rectified line voltage, which exactly opposes that component of the detector output which results from the line voltage induced retardation in the motor current phase angle.

Assuming that the phase detector 18 is so arranged that a retardation in the motor current phase angle produces a positive directed output. A negative directed DC voltage is introduced into the detector from the negative side of the line rectifier 29 through the resistance $R_c$ connected to the line 20. The standing part of this voltage is balanced out by positive voltage obtained from the positive side of the power supply through the resistor $R_b$ also connected to the line 20.

Thus, line voltage induced changes in the motor current phase angle and thence the detector output is balanced out through $R_c$.

As was previously mentioned, the basic circuit has many uses where torque is the controlling factor. For instance, the torque load on a process drive motor is a direct function of the rate of feed and the nature of the material being processed. A control means may be provided which varies the rate of feed of material in accordance with the torque load. Such a system would be useful in a process where the material has a varying physical state such as consistency, viscosity, hardness, density, quality etc. In such a system it is desirable to provide a feed rate which will automatically vary with the ease or difficulty in processing the material E.G. speed the process up for soft material or slow it down for hard material. This would provide a constant work output from the process without excessive light running or overload of the process drive motor.

Figure 2:
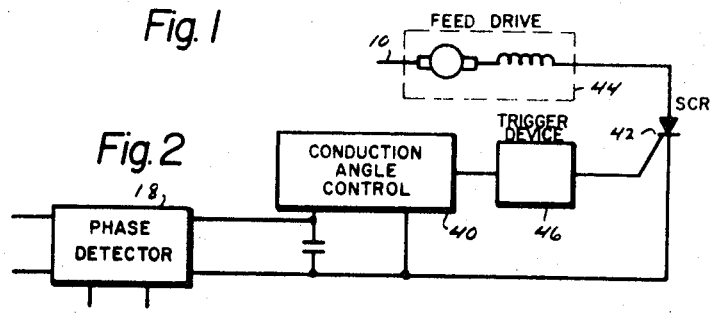
FIG. 2 is a diagrammatic view showing the invention as applied to a system where a feed motor is used in conjunction with a process motor.

Such a device is illustrated diagrammatically in FIG. 2, wherein the process motor torque analog output from the power factor torque sensing means 18 is connected to a conduction angle control 40 to vary the conduction angle of an SCR 42 in series with the feed drive motor 44 which receives its power from the line 10. A trigger device 46 is disposed between the conduction angle control and the SCR 42.

The circuitry is so arranged as to increase the conduction angle under light torque loads and reduce the conduction under high torque loads. Thus a reduction in process motor torque, when working softer or smaller quantities of material, will result in a longer conduction angle of the feed motor control SCR 42, which will speed up the feed motor and feed the material faster. Obviously the SCR could be replaced by a Triac. A harder or more dense material will cause a higher torque load on the process drive motor and this will cause the SCR to operate at a smaller conduction angle and slow down the feed drive motor.

Figure 3:
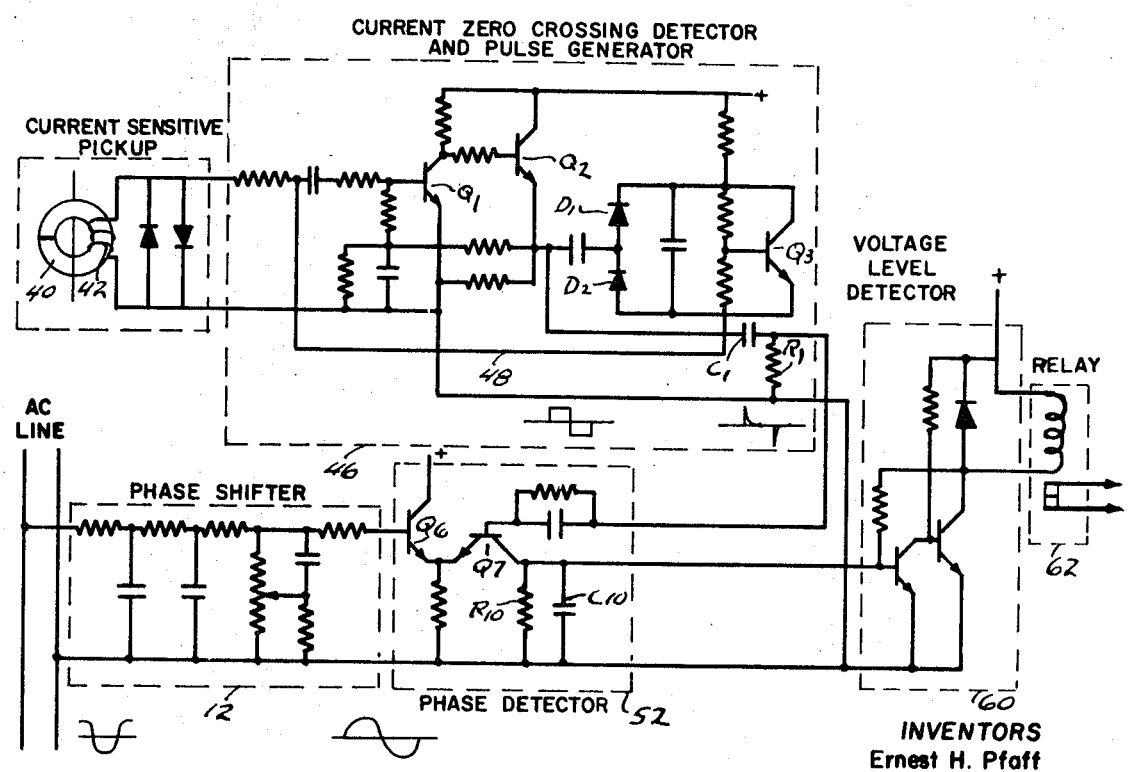
FIG. 3 is a diagrammatic view of a modification of the invention of FIG. 1.

FIG. 3 illustrates a device of a universal character in that it does not require a direct connection into the load circuit and can be used with loads of any size. One particular application is to motor circuits where the torque can be sensed and a relay closed upon decreasing torque load or a relay dropout with increasing torque load.

The drawing shows the circuitry in block diagram and with certain details of the circuitry within the blocks. It will be appreciated that details of the specific circuits may vary from that illustrated as known to those versed in the art.

Basically the difference between the improvement of FIG. 3 over that of FIG. 1, resides in the manner of picking up the current wave signal and converting it into pulses that are synchronized with a value of the wave, applying the voltage wave and the pulses to a detector the output of which is determined by the phase relationship of the voltage and current waves and is a DC analog thereof and using this output to control a load from which the signals are derived. More particularly a voltage wave or signal is derived from the AC line which feeds a load that will be assumed to be a motor which signal passes through a phase shifter 12, the same as in FIG. 1.

A current signal is obtained from the line by a current sensitive pickup device which may include a hinged core 40 that may be clamped around the line, in a manner well known in the art, and has a current sensitive pickup coil 42 from which a pair of leads connect to a zero current sensing detector and pulse generator 46. A pair of diodes connected in opposite directions are disposed across the pickup to eliminate high voltage transients.

The current detector 46 is arranged to provide pulses at the points of zero current. It will be apparent that detectors could be used that would convert the current wave to pulses at maximum current positions on the wave but the zero point is preferred because these are points that are fixed currentwise. In addition, other circuitry could be used to perform the same function, that shown being for the purpose of illustration rather than limitation and therefore will be described in its broader aspects with omission of detail, although the circuitry is complete.

The current wave signal is applied to the base of transistor $Q_1$, which is a high gain amplifier, and hence to $Q_2$, which is an emitter follower. The output from the amplifier is applied to a nonlinear feedback network comprised of the diodes $D_1$, $D_2$, transistor $Q_3$ and their associated capacitors and resistors from which the signal is fed back to the amplifier input by the line 48. With this arrangement the amplifier operates at open loop gain at the zero current crossing and at all other inputs has a heavy negative feedback. As can be seen by the waveforms shown below the respective parts, the signal is a sine wave at the input and is converted to a square wave at the output which is from the emitter $Q_2$ and ground. The square wave is then differentiated by the usual series capacitory $C_1$ and shunt resistor $R_1$ to provide positive and negative going pulses as shown by the waveform below, which pulses are synchronized with the points where the current wave crosses the zero line.

A means for detecting the difference in phase between the two signals is shown in block 52 labeled "phase detector". The signal from the phase shifter is applied to the base of transistor $Q_6$, and from the pulse generator to the base of transistor $Q_7$, the emitters being connected together. When a pulse is applied to $Q_7$, it turns the transistor on and a voltage appears at the collector which depends on the relation of the phase of the input signal to $Q_6$ to that of the position of the pulse on $Q_7$ which, as stated, occurred at zero crossing. This voltage is stored in the integrator circuit comprising the resistor $R_{10}$ and capacitor $C_{10}$ which stores the voltage until the next pulse comes along. This voltage is the DC analog of the phase angle between the load current and applied voltage.

Although not shown in FIG. 3, means of the order shown in FIG. 1 could be provided to introduce a DC voltage derived from the line supply to the phase detector output which would compensate for changes in line voltage to oppose the results from line voltage induced retardation in the motor current phase angle.

The output from the phase detector 52 is then applied to a voltage level detector 60, which in this instance is illustrated as a so-called Schmitt trigger circuit, the output of which is connected to the operating coil of a relay 62. In this instance the trigger circuit is used to energize the relay when the input to the trigger drops below a certain voltage which occurs when the current and voltage waveform come into the desired closeness of phase, representing greater motor torque, and to open the motor circuit and to close the contacts when the phase angle relationship increases.

We claim:

1. In combination with an AC line and a reactive load connected thereto, means for controlling the current to the load comprising means for obtaining an AC voltage signal from the line and for controlling the phase thereof, means for obtaining an AC current signal from the load, phase detector means connected to said phase control means and to said current signal means arranged to provide a direct current output voltage which is the DC analog of the phase angle relationship of said two signals, and means operated by said detector means connected to the load circuit to control the load circuit in the presence of the voltage from said detector.

2. An apparatus as described in claim 1, herein an AC current signal detector is arranged to detect the points where the current wave goes to zero.

3. An apparatus as described in claim 2, wherein means for generating pulses synchronized with said current zero points is provided and is connected to said AC current detector means.

4. An apparatus as described in claim 3, wherein said means for detecting the points where the current wave goes to zero comprises, an amplifier and a feedback means to cause the amplifier to operate at open loop gain at the zero points with heavy negative feed back at the other points to provide a substantially square wave output.

5. An apparatus as described in claim 4, wherein a differentiator circuit is connected to said output and converts the square wave output to pulses.

6. An apparatus as described in claim 3, wherein said phase detector has a first transistor ($Q_6$) connected (as an impedance changer) with its base emitter to the phase adjuster and a second transistor ($Q_7$) with its emitter connected to the emitter of the first transistor and its base connected to the pulse generator.

7. An apparatus as described in claim 6, wherein filter storage means is connected across the collector and ground of the second transistor and provides said DC analog voltage.

8. An apparatus as described in claim 7, wherein said filter storage means has a time constant sufficient to store the voltage between pulse intervals.

9. An apparatus as described in claim 8, wherein the means to control the load is a voltage level operated switch connected between the load and said filter storage means.

10. The method of controlling the AC current from a line to a reactive load which comprises extracting a voltage wave from the line and adjusting the phase thereof, extracting a current wave from the load and converting the current wave to pulses that coincide with the points where the current wave passes through the zero current points, and utilizing the phase controlled voltage wave and said pulses to generate an output which is the direct current analog of the phase angle between the applied voltage and the load current, and then utilizing said output to control the current to the load.

UNITED STATES PATENT OFFICE
CERTIFICATE OF CORRECTION

Patent No. 3,600,657          Dated August 17, 1971

Inventor(s) Ernest H. Pfaff and Thomas F. Mills, Jr.

It is certified that error appears in the above-identified patent and that said Letters Patent are hereby corrected as shown below:

> In the specification:
> Col 1, line 25, "precess" should read -process-;
> Col 2, line 62, "signal" should read -single-.

Signed and sealed this 4th day of January 1972.

(SEAL)
Attest:

EDWARD M. FLETCHER, JR.          ROBERT GOTTSCHALK
Attesting Officer          Acting Commissioner of Patents